(12) United States Patent
Xie et al.

(10) Patent No.: US 11,909,581 B2
(45) Date of Patent: Feb. 20, 2024

(54) CROSS-DOMAIN FAULT ANALYSIS METHOD AND SYSTEM

(71) Applicant: HUAWEI TECHNOLOGIES CO., LTD., Guangdong (CN)

(72) Inventors: Qing Xie, Dongguan (CN); Jiandong Ye, Bangkok (TH)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/319,883

(22) Filed: May 18, 2023

(65) Prior Publication Data
US 2023/0291640 A1 Sep. 14, 2023

Related U.S. Application Data

(63) Continuation of application No. PCT/CN2021/130168, filed on Nov. 11, 2021.

(30) Foreign Application Priority Data

Nov. 20, 2020 (CN) .......................... 202011307412.1
Jan. 7, 2021 (CN) .......................... 202110019596.X

(51) Int. Cl.
*H04L 41/0677* (2022.01)
*H04L 41/0631* (2022.01)
*H04L 41/12* (2022.01)

(52) U.S. Cl.
CPC ...... *H04L 41/0677* (2013.01); *H04L 41/0631* (2013.01); *H04L 41/12* (2013.01)

(58) Field of Classification Search
CPC .. H04L 41/0677; H04L 41/0631; H04L 41/12
See application file for complete search history.

(56) References Cited

U.S. PATENT DOCUMENTS

| | | | | |
|---|---|---|---|---|
| 5,768,501 A | * | 6/1998 | Lewis | H04Q 3/0075 714/48 |
| 6,006,016 A | * | 12/1999 | Faigon | G06F 11/2252 714/39 |
| 7,197,546 B1 | * | 3/2007 | Bagga | H04L 41/5077 709/219 |
| 8,464,279 B2 | * | 6/2013 | Gutjahr | H04L 41/064 709/224 |
| 9,432,870 B2 | * | 8/2016 | Jung | H04W 64/00 |
| 2020/0235985 A1 | * | 7/2020 | Embarmannar Vijayan | H04L 41/5019 |
| 2020/0235986 A1 | * | 7/2020 | Embarmannar Vijayan | G06F 9/45541 |
| 2021/0091999 A1 | * | 3/2021 | Mirza | H04L 41/064 |
| 2023/0031921 A1 | * | 2/2023 | Devendran | H04L 43/0858 |

* cited by examiner

*Primary Examiner* — Abdullahi E Salad
(74) *Attorney, Agent, or Firm* — Fish & Richardson P.C.

(57) ABSTRACT

The present disclosure relates to cross-domain fault analysis methods and systems. According to the methods and the systems, whether a first single-domain network fault and a second single-domain network fault are caused by a same fault is determined based on correlation analysis on the first single-domain network fault and the second single-domain network fault in time dimension and service dimension.

20 Claims, 8 Drawing Sheets

CROSS-DOMAIN FAULT ANALYSIS METHOD AND SYSTEM

CROSS-REFERENCE TO RELATED APPLICATIONS

This application is a continuation of International Application No. PCT/CN2021/130168, filed on Nov. 11, 2021, which claims priorities to Chinese Patent Application No. 202110019596.X, filed on Jan. 7, 2021 and Chinese Patent Application No. 202011307412.1, filed on Nov. 20, 2020. All of the aforementioned patent applications are hereby incorporated by reference in their entireties.

TECHNICAL FIELD

The present invention relates to the communications field, and in particular, to a cross-domain fault analysis method and system.

BACKGROUND

As a network of a carrier has developed to a 5th generation (the 5th generation, 5G) mobile communication technology, in a network architecture of the carrier, requirements on key performance indicators such as a latency, a rate, and a connection scale of the network increase, and service performance assurance and flexibility are both fundamentally changed. This increases network operation and maintenance difficulties.

However, to reduce network investment overheads, the carrier uses multi-domain network hybrid networking, for example, services based on internet protocol (Internet Protocol, IP) information data and optical information data that can be transmitted over a long distance by a transport network. A wireless base station transmits a wireless service to another side of the network via the transport network to complete signal transmission. An IP network, the transport network, and a wireless network herein are different service networks. Each service network may be referred to as a single-domain network. As a service scope of the carrier expands, the network of the carrier is usually a multi-domain network including the IP network, the transport network, and the wireless network. It is common that a signal passes through a plurality of single-domain networks.

However, when a network fault occurs in a multi-domain network, a network operation and maintenance system and a device of each service network generate a series of fault symptoms and pieces of alarm information. A large quantity of fault symptoms and pieces of alarm information cause a fault analysis system to process a large amount of data. This reduces efficiency.

SUMMARY

Embodiments of this application provide a cross-domain fault analysis method and system, to determine, by analyzing a plurality of single-domain faults, whether the plurality of single-domain faults are caused by a same fault point, to resolve a problem of low fault diagnosis efficiency caused by a fact that operation and maintenance personnel analyzes each single-domain fault because a same fault leads to a plurality of single-domain faults.

Technical solutions of embodiments of this application include following content.

According to a first aspect, a cross-domain fault analysis method is provided. In the method, a cross-domain fault analysis system obtains information about a first fault in a first network domain and information about a second fault in a second network domain, where the information about the first fault includes first time of the first fault and first service information of the first fault, and the information about the second fault includes second time of the second fault and second service information of the second fault. The cross-domain fault analysis system determines a time correlation based on the first time and the second time, where the time correlation is that the first time and the second time meet a time constraint condition; determines a service information correlation based on the first service information and the second service information, where the service information correlation is that the first service information and the second service information meet a service information constraint condition; and determines, based on the time correlation and the service information correlation, that the first fault in the first network domain and the second fault in the second network domain are caused by a same fault. According to the foregoing method, correlation analysis is performed on a network fault of a multi-domain network in time dimension and service dimension, to determine that a plurality of single-domain faults are caused by a same fault, thereby reducing resource investment for analyzing each single-domain fault, and improving network operation and maintenance efficiency.

In a possible implementation, the method further includes: determining cause information of the fault based on the information about the first fault and the information about the second fault; and sending the cause information of the fault to a third-party system through a northbound interface.

In a possible implementation, the method further includes: The time constraint condition is that an absolute value of a difference between the first time and the second time is less than a time threshold or that the first time and the second time are within a same time window.

In a possible implementation, the method further includes: A type of the first time includes time at which the first fault occurs, time at which the information about the first fault is generated, time at which the information about the first fault is sent, and/or time at which the information about the first fault is received. The first time includes at least one type of time information. For example, a value of the first time is the time at which the first fault occurs. A type of the second time includes time at which the second fault occurs, time at which the information about the second fault is generated, time at which the information about the second fault is sent, and/or time at which the information about the second fault is received. The second time includes at least one type of time information. For example, a value of the second time is the time at which the second fault occurs. The type of the second time is the same as that of the first time. For example, both the type of the first time and the type of the second time are time at which information about a fault is sent.

In a possible implementation, the method further includes: A type of the first service information includes service type information of the first fault, network topology information of the first network domain in which the first fault occurs, information about a network device in which the first fault occurs, and/or information about a service procedure in which the first fault occurs. The first service information includes at least one type of service information. A type of the second service information includes service type information of the second fault, network topology information of the second network domain in which the second fault occurs, information about a network device in which the second fault occurs, and/or information about a service procedure in which the second fault occurs. The second service information includes at least one type of service information. The type of the first service information is the same as that of the second service information.

In a possible implementation, the method further includes: The service information constraint condition is that service type information of the first service information and service type information of the second service information belong to a same service type or correlated service types. The service information constraint condition is that network topology information of the first service information and network topology information of the second service information belong to a same network topology. The service information constraint condition is that service procedure information of the first service information and service procedure information of the second service information belong to a same service procedure or belong to a fault causality.

In a possible implementation, the method further includes: receiving the information about the first fault from a fault analysis system of the first network domain, and receiving the information about the second fault from a fault analysis system of the second network domain. The fault analysis system of the first network domain and the fault analysis system of the second network domain belong to a single-domain network fault analysis system.

In a possible implementation, the method further includes: receiving, from the fault analysis system of the first network domain, first basic information for generating the information about the first fault; and receiving, from the fault analysis system of the second network domain, second basic information for generating the information about the second fault. The first basic information and the second basic information belong to basic information of a fault, for example, a fault alarm or a log of a faulty device. The cross-domain fault analysis system may generate the information about the first fault based on the first basic information, and generate the information about the second fault based on the second basic information.

According to a second aspect, a cross-domain fault analysis system is provided. The system includes: a fault information receiving module, configured to obtain information about a first fault in a first network domain and information about a second fault in a second network domain, where the information about the first fault includes first time of the first fault and first service information of the first fault, and the information about the second fault includes second time of the second fault and second service information of the second fault; a time correlation analysis module, configured to determine a time correlation based on the first time and the second time, where the time correlation is that the first time and the second time meet a time constraint condition; a service information correlation analysis module, configured to determine a service information correlation based on the first service information and the second service information, where the service information correlation is that the first service information and the second service information meet a service information constraint condition; and a cross-domain fault determining module, configured to determine, based on the time correlation and the service information correlation, that the first fault in the first network domain and the second fault in the second network domain are caused by a same fault.

In a possible implementation, the system further includes: a cross-domain fault cause analysis module, configured to determine cause information of a cross-domain fault based on the information about the first fault and the information about the second fault; and a cross-domain fault cause synchronization module, configured to send the cause information of the cross-domain fault to a third-party system through a northbound interface.

In a possible implementation, the system further includes: The time constraint condition is that an absolute value of a difference between the first time and the second time is less than a time threshold or that the first time and the second time are within a same time window.

In a possible implementation, the system further includes: A type of the first time includes time at which the first fault occurs, time at which the information about the first fault is generated, time at which the information about the first fault is sent, and/or time at which the information about the first fault is received. The first time includes at least one type of time information. For example, a value of the first time is the time at which the first fault occurs. A type of the second time includes time at which the second fault occurs, time at which the information about the second fault is generated, time at which the information about the second fault is sent, and/or time at which the information about the second fault is received. The second time includes at least one type of time information. For example, a value of the second time is the time at which the second fault occurs. The type of the second time is the same as that of the first time. For example, both the type of the first time and the type of the second time are time at which information about a fault is sent.

In a possible implementation, the system further includes: A type of the first service information includes service type information of the first fault, network topology information of the first network domain in which the first fault occurs, information about a network device in which the first fault occurs, and/or information about a service procedure in which the first fault occurs. The first service information includes at least one type of service information. A type of second service information includes service type information of the second fault, network topology information of the second network domain in which the second fault occurs, information about a network device in which the second fault occurs, and/or information about a service procedure in which the second fault occurs. The second service information includes at least one type of service information. The type of the first service information is the same as that of the second service information.

In a possible implementation, the system further includes: The service information constraint condition is that service type information of the first service information and service type information of the second service information belong to a same service type or correlated service types. The service information constraint condition is that network topology information of the first service information and network topology information of the second service information belong to a same network topology. The service information constraint condition is that service procedure information of the first service information and service procedure information of the second service information belong to a same service procedure or belong to a fault causality.

In a possible implementation, the system further includes: The fault information receiving module is configured to receive the information about the first fault from a fault analysis system of the first network domain, and receive the information about the second fault from a fault analysis system of the second network domain. The fault analysis system of the first network domain and the fault analysis system of the second network domain belong to a single-domain network fault analysis system.

In a possible implementation, the system further includes: The fault information receiving module is configured to receive, from the fault analysis system of the first network domain, first basic information for generating the information about the first fault, and receive, from the fault analysis system of the second network domain, second basic information for generating the information about the second fault. The first basic information and the second basic information belong to basic information of a fault, for example, a fault alarm or a log of a faulty device. The fault information receiving module may generate the information about the first fault based on the first basic information, and generate the information about the second fault based on the second basic information.

According to a third aspect, a computer storage medium is provided. The computer storage medium stores program code, where the program code indicates to execute the method according to the first aspect or any possible implementation of the first aspect.

According to a fourth aspect, a computer program product is provided. The computer program product includes computer program code. When the computer program code is run on a computer, the computer is enabled to execute the method according to the first aspect or any possible implementation of the first aspect.

DESCRIPTION OF EMBODIMENTS

To make the objectives, technical solutions, and advantages of this application clearer, the following further describes this application in detail with reference to the accompanying drawings. It is clear that described embodiments are merely a part of rather than all of embodiments of this application.

A network architecture and a service scenario that are described in embodiments of this application serve as examples to describe the technical solutions of this application. This does not mean that this application is applicable only to the following embodiments. A person of ordinary skill in the art may know that, with evolution of a network architecture and emergence of a new service scenario, the technical solutions provided this application are also applicable to a similar technical problem.

Figure 1:
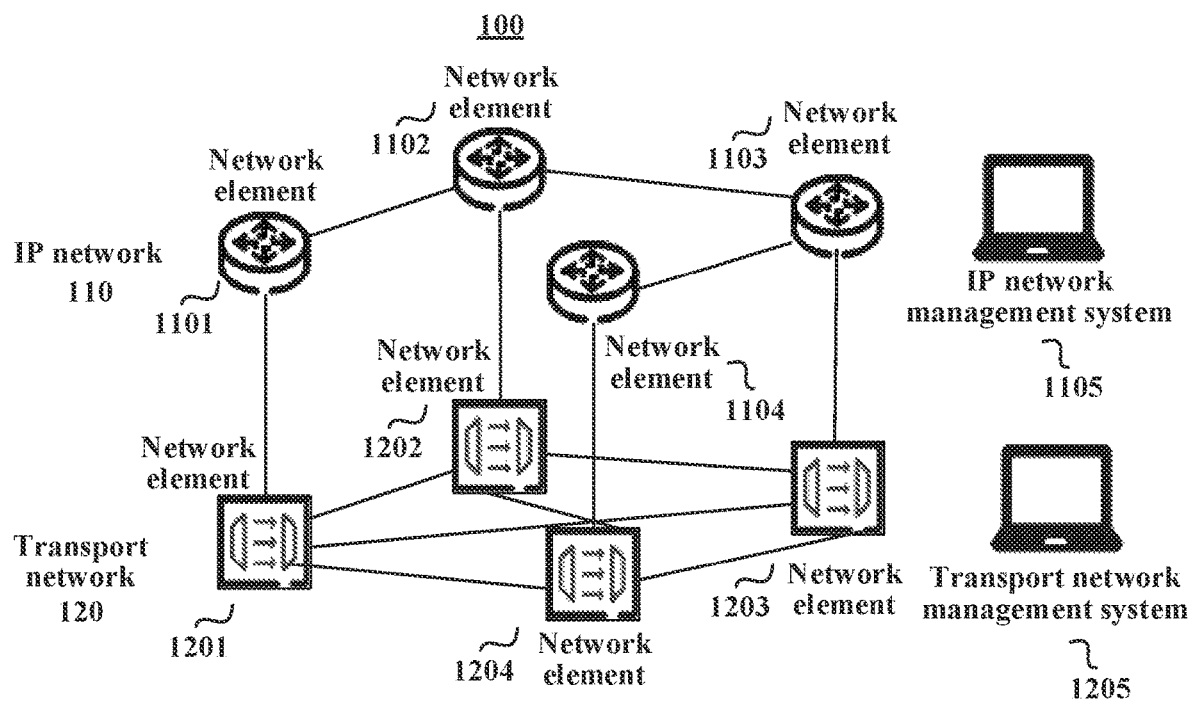
FIG. 1 is a schematic diagram of a network according to an embodiment of this application.

FIG. 1 is a schematic diagram of a network according to an embodiment of this application. As shown in FIG. 1, a network 100 is a multi-domain network and includes an internet protocol (Internet Protocol, IP) network 110 and a transport network 120. As shown in FIG. 1, a network element 1101 to a network element 1104 are network element devices of the IP network 110, for example, a router. Communication among the network element 1101 to the network element 1104 is performed according to an IP network protocol, for example, a generalized multi-protocol label switching (Multi-protocol Label Switching, MPLS) protocol. An IP network fault analysis system 1105 is a fault analysis system of the IP network 110 and is responsible for monitoring and analyzing a fault of a network element in the IP network 110, a link between network elements, and a service running on a network. As shown in FIG. 1, a network element 1201 to a network element 1204 are network element devices of the transport network 120, for example, an optical network device. Communication among the network element 1201 to the network element 1204 is performed according to a transport network protocol, for example, a generalized multi-protocol label switching (Generalized Multi-protocol Label Switching, GMPLS) protocol. A transport network fault analysis system 1205 is a fault analysis system of the transport network 120 and is responsible for monitoring and analyzing a fault of a network element in the transport network 120, a link between network elements, and a service running on the network. The IP network fault analysis system 1105 and the transport network fault analysis system 1205 respectively provide fault monitoring and analysis for the IP network 110 and the transport network 120. For example, when a network fault occurs in the network 100 because an optical fiber between the network element 1202 and the network element 1203 in the transport network 120 is accidentally cut by construction personnel, the IP network 110 and the transport network 120 are faulty due to the network fault. For example, in a fault analysis system, the IP network fault analysis system 1105 monitors the following cases: 1. Link interruption alarm information reported by the network element 1102 and the network element 1103. 2. Link switching alarm information reported by the network element 1101. The IP network fault analysis system 1105 needs to perform fault analysis on the monitored alarm information. The transport network fault analysis system 1205 monitors link interruption alarm information reported by the network element 1202 and the network element 1203. In this example, a fault that occurs in a multi-domain network may cause an included single-domain network to be faulty. Network operation and maintenance personnel need to manually analyze fault information reported by fault analysis systems of a plurality of single-domain networks. The analysis process needs to be performed based on personal experience and a plurality of pieces of dimension information such as a network topology and service configuration. This manner greatly reduces fault analysis efficiency and affects running of a network service.

Figure 2:
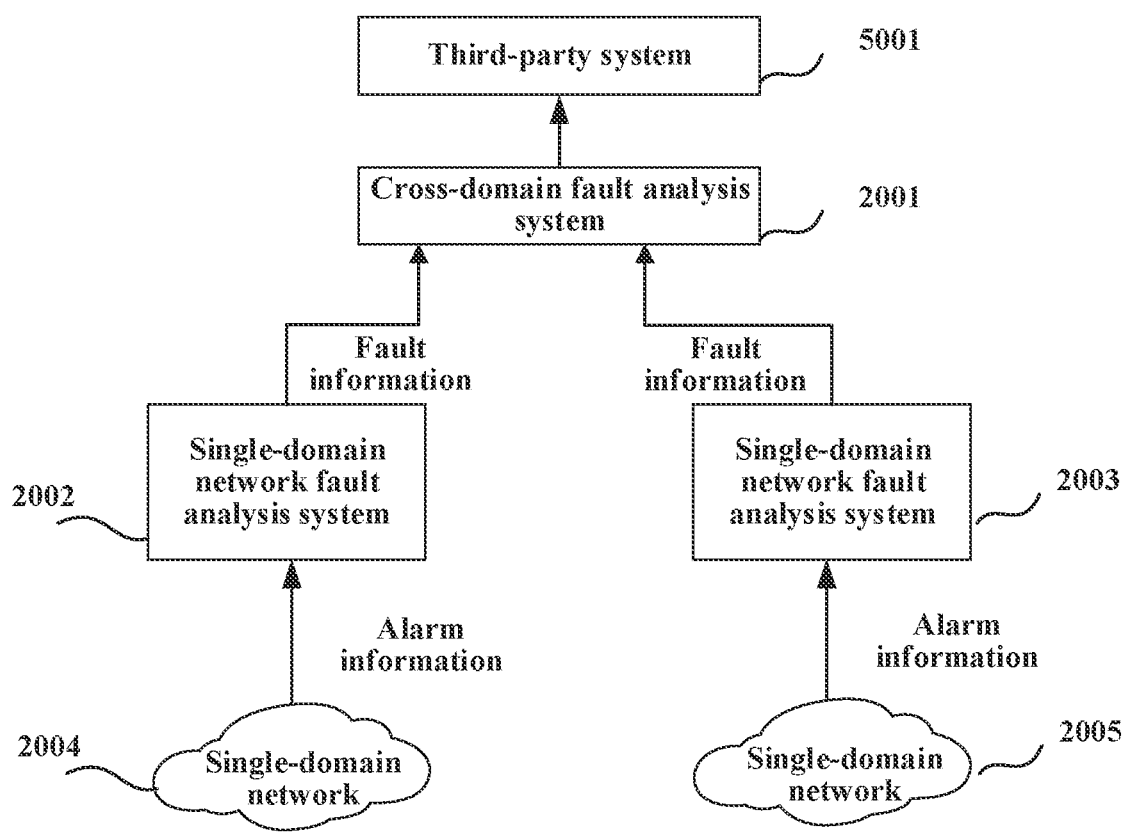
FIG. 2 is a schematic architectural diagram according to an embodiment of this application.

FIG. 2 is a schematic architectural diagram according to an embodiment of this application. In some embodiments of this application, as shown in FIG. 2, a system 200 includes a single-domain network 2004, a single-domain network 2005, a single-domain network fault analysis system 2002, a single-domain network fault analysis system 2003, a cross-domain fault analysis system 2001, and a third-party system 5001. The single-domain network 2004 and the single-domain network 2005 are two service networks. For example, the single-domain network 2004 is an IP network, and the single-domain network 2005 is a transport network. The single-domain network fault analysis system 2002 is a fault analysis system of the single-domain network 2004. A device and a system in the single-domain network 2004 report generated alarm information, an exception log, and collected monitoring information, for example, performance information, to the single-domain network fault analysis system 2002. The single-domain network fault analysis system 2002 receives the alarm information, the exception log, and the monitoring information reported by the single-domain network 2004, performs analysis based on the alarm information, the exception log, and the monitoring information, analyzes a root cause of a fault, generates fault information, and reports the fault information to the cross-domain fault analysis system 2001. The fault information includes information about a single-domain network in which the fault occurs, time information of the fault, service information of the fault, and a cause of the fault. Similarly, the single-domain network fault analysis system 2003 is a fault analysis system of the single-domain network 2005. A device and a system in the single-domain network 2005 report generated alarm information, an exception log, and collected monitoring information, for example, performance information, to the single-domain network fault analysis system 2003. The single-domain network fault analysis system 2003 performs fault monitoring and analysis on the single-domain network 2005 based on the alarm information, the exception log, and the monitoring information that are received, generates fault information, and reports the fault information to the multi-domain fault analysis system 2001. The cross-domain fault analysis system 2001 receives the fault information reported by the single-domain network fault analysis system 2002 and the single-domain network fault analysis system 2003. On the basis of the fault information, the cross-domain fault analysis system 2001 determines, based on a time correlation and a service information correlation for faults that occur in a plurality of single-domain networks, that a plurality of faults are caused by a same fault. If it is determined that the plurality of faults are caused by the same fault, the cross-domain fault analysis system 2001 analyzes a cause of the fault, and synchronizes the cause of the fault to the third-party system 5001 through a northbound open interface. In this method, fault analysis workload of operation and maintenance personnel is reduced and fault analysis efficiency is improved.

Figure 3:
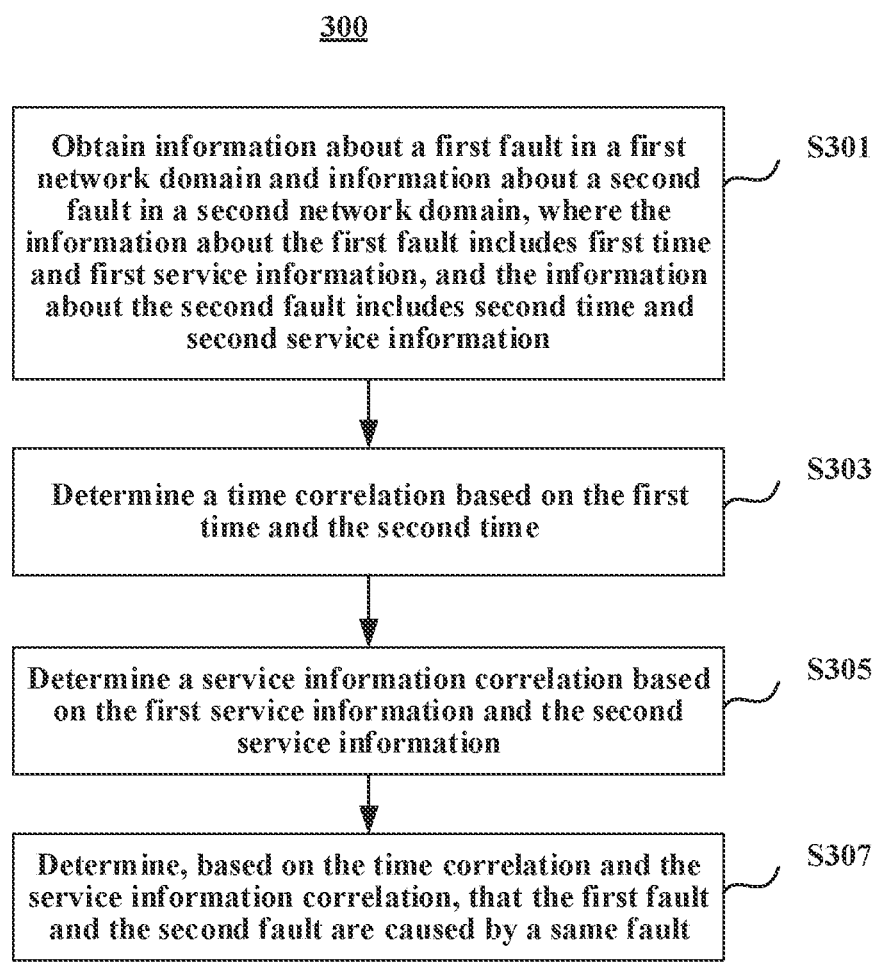
FIG. 3 is a flowchart of a cross-domain fault analysis method according to an embodiment of this application.

FIG. 3 is a flowchart according to an embodiment of this application. In some embodiments of this application, a cross-domain fault analysis procedure in a multi-domain network shown in FIG. 3 includes the following content.

S301: Obtain information about a first fault in a first network domain and information about a second fault in a second network domain, where the information about the first fault includes first time and first service information, and the information about the second fault includes second time and second service information.

In some embodiments, for example, the cross-domain fault analysis system 2001 shown in FIG. 2 obtains the information about the first fault in the first network domain, that is, the single-domain network 2004. The information about the first fault is generated by the single-domain network fault analysis system 2002 corresponding to the single-domain network 2004 based on the alarm information, the exception log, and the monitoring information that are received from the single-domain network 2004. The information about the first fault includes the first time and the first service information. A type of the first time includes time at which the first fault occurs, time at which the information about the first fault is generated, time at which the information about the first fault is sent, and/or time at which the information about the first fault is received. The first time includes at least one type of time information. The first service information is service information corresponding to the first fault and includes service type information of the first fault, network topology information of a single-domain network in which the first fault occurs, information about a network device in which the first fault occurs, and information about a service procedure in which the first fault occurs. The cross-domain fault analysis system 2001 obtains the information about the second fault in the second network domain, that is, the single-domain network 2005. The information about the second fault is generated by the single-domain network fault analysis system 2003 corresponding to the single-domain network 2005 based on the alarm information and the monitoring information that are received from the single-domain network 2005. The information about the second fault includes the second time and the second service information. A type of the second time includes time at which the second fault occurs, time at which the information about the second fault is generated, time at which the information about the second fault is sent, and/or time at which the information about the second fault is received. The second time includes at least one type of time information, and the type of the second time is consistent with that of the first time. The second service information is service information corresponding to the second fault and includes service type information of the second fault, network topology information of a single-domain network in which the second fault occurs, information about a network device in which the second fault occurs, and information about a service procedure in which the second fault occurs.

In some embodiments, the cross-domain fault analysis system 2001 receives first basic information of the first fault of the single-domain network 2004 from the single-domain network fault analysis system 2002. The first basic information is the alarm information, the alarm log, and the monitoring information received by the single-domain network fault analysis system 2002 from the single-domain network 2004 or analysis information generated based on the foregoing information. The cross-domain fault analysis system 2001 receives second basic information of the second fault of the single-domain network 2004 from the single-domain network fault analysis system 2003. The second basic information is the alarm information, the alarm log, and the monitoring information received by the single-domain network fault analysis system 2003 from the single-domain network 2005 or analysis information generated based on the foregoing information. The cross-domain fault analysis system 2001 generates the information about the first fault based on the first basic information, and generates the information about the second fault based on the second basic information.

S303: Determine a time correlation based on the first time and the second time.

In some embodiments, the cross-domain fault analysis system 2001 shown in FIG. 2 determines the time correlation based on the first time and the second time. The first time refers to first time information in the information about the first fault, and the second time refers to second time information in the information about the second fault. The type of the first time includes time at which the first fault occurs, time at which the information about the first fault is generated, time at which the information about the first fault is sent, and/or time at which the information about the first fault is received. The first time includes at least the foregoing type of time information. The type of the second time includes time at which the second fault occurs, time at which the information about the second fault is generated, time at which the information about the second fault is sent, and/or time at which the information about the second fault is received. The second time includes at least the foregoing type of time information. The type of the first time is consistent with that of the second time. In this case, the time correlation is that a difference between the first time and the second time is less than a time threshold or that the first time and the second time are within one time window. As shown in FIG. 2, network devices in the single-domain network 2004, network devices in the single-domain network 2005, the single-domain network fault analysis system 2002, the single-domain network fault analysis system 2003, and the cross-domain fault analysis system 2001 each have an independent system clock. Automatic synchronization of the system clock is implemented according to a network time protocol (Network Time Protocol, NTP). For system time of a network device and a system, in some embodiments, the first time is time at which the first fault occurs, and the second time is time at which the second fault occurs. In some embodiments, the first time is time at which the information about the first fault is generated, and the second time is time at which the information about the second fault is generated. In some embodiments, the first time is time at which the information about the first fault is sent, and the second time is time at which the information about the second fault is sent. In some embodiments, the first time is time at which the information about the first fault is received, and the second time is time at which the information about the second fault is received. For example, the first time is $T_1$, and a unit of $T_1$ is second. The second time is $T_2$, and a unit of $T_2$ is second. A time threshold or a time window length of the time correlation is $\sigma$ with a unit of second. If an absolute value of a difference between $T_1$ and $T_2$ is less than $\sigma$, or $T_1$ and $T_2$ may be within a same time window, the first time and the second time have a time correlation. For example, the first time is the time at which the first fault occurs, a value of the first time is 8:55:55 2020-12-12, a value of the second time is 8:59:55 2020-12-12, and a time threshold or time window length is 300 seconds. After calculation, an absolute value of a difference between the first time and the second time is 240 seconds, and the absolute value of the difference is less than the time threshold, or the first time and the second time are within a time window of 300 seconds, so that the first time and the second time have a time correlation. For example, the first time is time at which the information about the first fault is generated. In some embodiments, the information about the first fault is generated by a single-domain network fault analysis system, a value of the first time is 8:56:10 2020-12-12, a value of the second time is 9:00:30 2020-12-12, and a time threshold or time window length is 200 seconds. After calculation, an absolute value of a difference between the first time and the second time is 260 seconds, and the absolute value of the difference is greater than the time threshold, or the first time and the second time are not within a time window of 200 seconds, so that the first time and the second time have no time correlation.

S305: Determine a service information correlation based on the first service information and the second service information.

In some embodiments, the cross-domain fault analysis system 2001 shown in FIG. 2 determines the service information correlation based on the first service information and the second service information. A type of service information of a fault generated by the single-domain network fault analysis system includes service type information corresponding to the fault, network topology information of a single-domain network in which the fault occurs, information about a network device in which the fault occurs, and information about a service procedure in which the fault occurs. For example, the type of the first service information includes the service type information corresponding to the first fault, the network topology information of the single-domain network in which the first fault occurs, the information about the network device in which the first fault occurs, and the information about the service procedure in which the first fault occurs. The first service information includes at least one type of service information. The type of the second service information includes the service type information corresponding to the second fault, the network topology information of the single-domain network in which the second fault occurs, the information about the network device in which the second fault occurs, and the information about the service procedure in which the second fault occurs. The second service information includes at least one type of service information. It should be noted that, before determining the service information correlation based on the first service information and the second service information, the cross-domain fault analysis system needs to ensure that the first service information and the second service information are a same type of information.

In some embodiments, the service type information of the fault is classified based on a network domain dimension. In this case, the service type information includes an IP network service, a transport network service, and a wireless network service. In some embodiments, the service type information of the fault is classified based on a network scenario dimension. In this case, the service type information of the fault includes an IP local area network (Local Area Network, LAN) service, an IP wireless local area network (Wireless Local Area Network, WLAN), an optical transport network (Optical Transport Network, OTN), a packet transport network (Packet Transport Network, PTN), a metropolitan area exchange (Metropolitan Area Exchange, MAE) network, a radio access network (Radio Access Network), and an IP radio access network (Internet Protocol Radio Access Network, IPRAN). In some embodiments, the service type information of the fault is classified based on an open systems interconnection (Open Systems Interconnection, OSI) 7-layer model dimension. In this case, the service type information of the fault includes a physical layer service, a data link layer service, a network layer service, a transport layer service, a session layer service, a presentation layer service, and an application layer service. For example, service type information corresponding to a fault of an optical fiber connection interface in an optical transport network domain is a port service of the physical layer service, and service type information corresponding to a BGP routing switchover fault is a routing service of the network layer service. For example, as shown in FIG. 2, a type of service information in the first service information in the information about the first fault generated by the single-domain network fault analysis system 2002 is the IP network service, and a type of service information in the second service information in the information about the second fault generated by the single-domain network fault analysis system 2003 is the transport network service. It should be noted that, in some embodiments, the service type information of the fault may include one or more types of service type information. For example, service type information of a fault is service type information 1: IP network and service type information 2: MPLS. The service type information indicates that a service type of a single-domain network in which the fault occurs is an IP network, and specifically a network layer service MPLS.

The network topology information of the single-domain network in which the fault occurs includes information about a network device node in the single-domain network in which the fault occurs, information about a physical connection relationship existing between the network device nodes, and information about a logical connection relationship existing between the network device nodes. In some embodiments, the information about the network device node includes a network device name, a network device type, and a network device serial number. The information about the physical connection relationship between the network device nodes includes a type of the physical connection, port names of the network device nodes forming a physical connection link, and/or port status information of the network device node. The information about the logical connection relationship between the network device nodes includes a type of the logical connection, port names of the network device nodes forming a logical connection link, and/or port status information of the network device node. For example, as shown in FIG. 2, the network topology information of the fault generated by the single-domain network 2004 includes device names, device types, and device serial numbers of network device nodes: the network element 1101, the network element 1102, the network element 1103, and the network element 1104 that are of the single-domain network 2004, and the information about the physical connection relationship and the logical connection relationship that exist among the network element 1101, the network element 1102, the network element 1103, and the network element 1104, for example, a gigabit Ethernet (Gigabit Ethernet, GE) physical connection link between the network element 1101 and the network element 1102, a GE physical connection link between the network element 1101 and the network element 1103, and a GE physical connection link between the network element 1101 and the network element 1104.

The information about the network device in which the fault occurs includes basic information of a network device that reports alarm information of a fault and/or basic information of a network device in which a fault is caused and analyzed by the single-domain network fault analysis system. In some embodiments, the basic information of the network device includes a network device name, a network device type, a network device serial number, a network device management IP address, and/or port information. The port information includes a port name, a port status, and traffic statistics information of the port. For example, as shown in FIG. 2, a fault generated by the single-domain network 2004 is analyzed by the single-domain network fault analysis system 2002, and a configuration error of the network element 1101 causes the fault. In this case, the information about the network device in which the fault occurs includes the device name, the device type, the device serial number, the device management IP address, and the port information of the network element 1101.

The information about the service procedure in which the fault occurs includes a normal procedure status corresponding to a service in which the fault occurs and/or a service status caused by the fault. For example, as shown in FIG. 2, a packet loss of an MPLS label distribution path negotiation packet generated by the single-domain network 2004 causes an MPLS label distribution path negotiation failure. The information about the service procedure in which the fault occurs includes a normal procedure status of an MPLS label distribution path negotiation service in which the fault occurs and a service status of the MPLS label distribution path negotiation failure caused by the fault.

In some embodiments, an information format of the fault generated by the single-domain network fault analysis system is shown in Table 1. The cross-domain fault analysis system receives the information about the fault generated by the single-domain network fault analysis system, and obtains data based on the information format shown in Table 1. Source information of the fault identifies a single-domain network in which the fault is generated and the single-domain network fault analysis system. Number information of the fault identifies a number of the fault, where the number is generated by the single-domain network fault analysis system or a cross-domain network fault analysis system. The time information identifies the time information of the fault. A type of the time information of the fault includes time at which the fault occurs, time at which information about the fault is generated, time at which the information about the fault is sent, and/or time at which the information about the fault is received. The time information includes at least the foregoing type of time information. In this case, time information types of the information about the fault are ensured to be consistent by configuring a time information type of the fault in the single-domain network fault analysis system or by configuring a time information type of the received information about the fault in the cross-domain fault analysis system. The service type information identifies the service type information corresponding to the fault. The network topology information identifies the information about the network device node that is in the network topology and in which the fault occurs and link information between the network device nodes. The information about the network device identifies the information about the network device in which the fault occurs, for example, the information about the network device in which the alarm information of the fault is reported. The information about the service procedure identifies the information about the service procedure in which the fault occurs.

TABLE 1

| Data name | Data value |
| --- | --- |
| Fault source | Name of a single-domain network in which a fault is generated and name of a single-domain network fault analysis system |
| Fault number | Number of a fault |
| Time information | Time information of a fault |
| Service type information | Service type information corresponding to a fault |
| Network topology information | Information about a network device node that is in a network topology and in which a fault occurs and link information between network device nodes |

TABLE 1-continued

| Data name | Data value |
|---|---|
| Information about a network device | Information about a network device in which a fault occurs |
| Information about a service procedure | Information about a service procedure in which a fault occurs |

For example, the single-domain network fault analysis system 2002 reports information about the fault 1001 of the single-domain network 2004, as shown in Table 2. The single-domain network fault analysis system 2003 reports information about the fault 2001 of the single-domain network 2005, as shown in Table 3.

TABLE 2

| Data name | Data value |
|---|---|
| Fault source | Single-domain network 2004<br>Single-domain network fault analysis system 2002 |
| Fault number | 2004200201001 |
| Time information | 08555520201212 |
| Service type information | Service type information 1: IP network; service type information 2: MPLS |
| Network topology information | [{<br>"Device name": router 1101,<br>"Device type": router,<br>"Device number": 20201122334445501,<br>"Device name": router 1102,<br>"Device type": router,<br>"Device number": 20201122334445502,<br>"Device name": router 1103,<br>"Device type": router,<br>"Device number": 20201122334445503,<br>"Device name": router 1104,<br>"Device type": router,<br>"Device number": 20201122334445504,<br>"Link information":<br>GE physical link between a port G0/0/1 of the router 1101 and a port G0/0/2 of the router 1102,<br>GE physical link between a port G0/0/3 of the router 1102 and a port G0/0/1 of the router 1103,<br>GE physical link between a port G0/0/2 of the router 1103 and a port G0/0/1 of the router 1104,<br>port G1/0/1 10G optical port of the router 1101 is connected to an unknown device,<br>port G1/0/1 10G optical port of the router 1102 is connected to an unknown device,<br>port G1/0/1 10G optical port of the router 1103 is connected to an unknown device, and<br>port G1/0/1 10G optical port of the router 1104 is connected to an unknown device<br>}] |
| Information about a network device | [{<br>"Device name": router 1101,<br>"Device type": router,<br>"Device number": 20201122334445501,<br>"Port information":<br>port G0/0/1: an electrical port running normally,<br>port G1/0/1: an optical port running normally<br>}] |
| Information about a service procedure | MPLS label distribution path negotiation between the router 1104 and the router 1101 fails |

TABLE 3

| Data name | Data value |
|---|---|
| Fault source | Single-domain network 2005<br>Single-domain network fault analysis system 2003 |
| Fault number | 2005200302001 |
| Time information | 08530120201212 |
| Service type information | OTN network |
| Network topology information | [{<br>"Device name": OTN 1201, |

TABLE 3-continued

| Data name | Data value |
|---|---|
| | "Device type": optical transport device,<br>"Device number": 2020556677889901,<br>"Device name": OTN 1202,<br>"Device type": optical transport device,<br>"Device number": 2020556677889902,<br>"Device name": OTN 1203,<br>"Device type": optical transport device,<br>"Device number": 2020556677889903,<br>"Device name": OTN 1204,<br>"Device type": optical transport device,<br>"Device number": 2020556677889904,<br>"Link information":<br>10G optical physical link between slot number 1-board 1-port 2 of the OTN 1201 and slot number 1-board 1-port 1 of the OTN 1202,<br>10G optical physical link between slot number 1-board 1-port 2 of the OTN 1201 and slot number 1-board 1-port 1 of the OTN 1203,<br>10G optical physical link between slot number 1-board 1-port 2 of the OTN 1202 and slot number 1-board 1-port 2 of the OTN 1203,<br>10G optical physical link between slot number 1-board 1-port 3 of the OTN 1202 and slot number 1-board 1-port 2 of the OTN 1204,<br>10G optical physical link between slot number 1-board 1-port 3 of the OTN 1203 and slot number 1-board 1-port 3 of the OTN 1204,<br>10G optical physical link between slot number 1-board 2-port 1 of the OTN 1201 and an unknown device,<br>10G optical physical link between slot number 1-board 2-port 1 of the OTN 1202 and an unknown device,<br>10G optical physical link between slot number 1-board 2-port 1 of the OTN 1203 and an unknown device, and<br>10G optical physical link between slot number 1-board 2-port 1 of the OTN 1204 and an unknown device<br>}] |
| Information about a network device | [{<br>"Device name": OTN 1201,<br>"Device type": optical transport device,<br>"Device number": 2020556677889902<br>}] |
| Information about a service procedure | [{<br>Signal loss on optical network port of slot number 1-board 1-port 1 of the OTN 1201<br>}] |

In some embodiments, the first service information is the service type information corresponding to the first fault, and the second service information is the service type information corresponding to the second fault. The service information correlation between the first service information and the second service information is determined based on the first service information and the second service information. In this case, the service information correlation is a constraint condition for determining the service type information corresponding to the first fault and the service type information corresponding to the second fault. In some embodiments, if the service type information corresponding to the first fault is the same as the service type information corresponding to the second fault, the service type information of the fault and the service type information of the second fault meet the constraint condition, and the cross-domain fault analysis system determines that the service information correlation is that the first service information and the second service information have the service information correlation. In some embodiments, if the service type information corresponding to the first fault and the service type information corresponding to the second fault meet the service correlation relationship, the cross-domain fault analysis system determines that the service information correlation meets the constraint condition, and the first service information and the second service information have the service information correlation. For example, as shown in Table 2, service type information of the fault 1001 of the single-domain network 2004 is the service type information 1: IP network and the service type information 2: MPLS. As shown in Table 3, a service type of the fault 2001 of the single-domain network 2005 is the OTN network. As shown in FIG. 2, the single-domain network 2004 is the IP network 110 shown in FIG. 1, and the single-domain network 2005 is the transport network 120 shown in FIG. 1. The single-domain network 2004 and the single-domain network 2005 are further connected by an optical fiber, data transmission needs to be performed based on the OTN network of the single-domain network 2005, and a dependency relationship exists on a physical link. Therefore, the cross-domain fault analysis system 2001 is associated with an IP network service and an OTN network service. It is determined that the service type information of the fault 1001 and the service type information of the fault 2001 meet the constraint condition, and the fault 1001 and the fault 2001 have the service information correlation.

In some embodiments, the first service information is the network topology information of the single-domain network in which the first fault occurs, and the second service information is the network topology information of the single-domain network in which the second fault occurs. The service information correlation between the first service information and the second service information is determined based on the first service information and the second service information. In some embodiments, the service information correlation is used to determine a correlation relationship between network topology information of a first service and network topology information of a second service. For example, as shown in FIG. 2, the single-domain network 2004 is the IP network 110 shown in FIG. 1, the single-domain network 2005 is the transport network 120 shown in FIG. 1. Information about the fault 1001 generated by the single-domain network fault analysis system 2002 corresponding to the single-domain network 2004 is shown in Table 2. Information about the fault 2001 generated by the single-domain network fault analysis system 2003 corresponding to the single-domain network 2005 is shown in Table 3. Cross-domain topology data of the single-domain network 2004 and the single-domain network 2005 is input to the cross-domain fault analysis system 2001. The cross-domain topology data includes a cross-domain link name, a link type, and port information corresponding to a link. For example, the cross-domain topology data between the single-domain network 2004 and the single-domain network 2005 includes cross-domain link names of the network elements 1101 to 1104 of the single-domain network 2004 and the network elements 1201 to 1204 of the single-domain network 2005, the cross-domain link type, and port information corresponding to the cross-domain link. The cross-domain fault analysis system 2001 receives the information about the fault 1001 generated by the single-domain network fault analysis system 2002. The cross-domain fault analysis system 2001 obtains the network topology information of the single-domain network 2004 in which the fault 1001 occurs. The cross-domain fault analysis system 2001 receives the information about the fault 2001 generated by the single-domain network fault analysis system 2003. The cross-domain fault analysis system 2001 obtains the network topology information of the single-domain network 2005 in which the fault 2001 occurs. The cross-domain fault analysis system 2001 determines, based on the cross-domain topology data, the network topology information of the fault 1001 shown in Table 2, and the network topology information of the fault 2001 shown in Table 3, that the network topology information of the fault 1001 and the network topology information of the fault 2001 have a common network device node. Therefore, there is a correlation relationship between the network topology information of the fault 1001 and the network topology information of the fault 2001, and service information of the fault 1001 and service information of the fault 2001 have a service information correlation.

In some embodiments, the first service information is the information about the service procedure in which the first fault occurs, and the second service information is the information about the service procedure in which the second fault occurs. The service information correlation between the first service information and the second service information is determined based on the first service information and the second service information. In this case, the service information correlation is used to determine that the information about the service procedure in which the first fault occurs and the information about the service procedure in which the second fault occurs belong to the same service procedure or belong to a fault causality. For example, the single-domain network 2004 in FIG. 2 is the IP network 110 shown in FIG. 1, and the single-domain network 2005 is the transport network 120 shown in FIG. 1. The information that is about the service procedure in which the fault occurs and that is in the information about the fault 1001 generated by the single-domain network fault analysis system 2002 of the single-domain network 2004 is that "MPLS label distribution path negotiation between the router 1104 and the router 1101 fails". The information that is about the service procedure in which the fault occurs and that is in the information about the fault 2001 generated by the single-domain network fault analysis system 2003 of the single-domain network 2005 is "signal loss on optical network port of slot number 1-board 1-port 1 of the OTN 1201". On the basis of the cross-domain network topologies of the single-domain network 2004 and the single-domain network 2005, the cross-domain fault analysis system 2001 may analyze that data packet communication between the router 1101 and the router 1104 is based on an optical fiber link between the OTN 1201 and the OTN 1204. Therefore, the information about the service procedure in which the fault 2001 occurs is "signal loss on optical network port of slot number 1-board 1-port 1 of the OTN 1201", causing the fiber link between the OTN 1201 and the OTN 1204 to be unavailable. In this case, data packet communication between the router 1101 and the router 1104 fails. As a result, the service procedure information of the fault 1001 is that "MPLS label distribution path negotiation between the router 1104 and the router 1101 fails". Therefore, the service information of the fault 1001 and the service information of the fault 2001 have a correlation relationship, and the service information of the fault 1001 and the service information of the fault 2001 have a service information correlation.

S307: Determine, based on the time correlation and the service information correlation, that the first fault and the second fault are caused by a same fault.

In some embodiments, the cross-domain fault analysis system 2001 shown in FIG. 2 obtains a time correlation and a service information correlation between the first fault and the second fault through S305 based on the information about the first fault reported by the single-domain network fault analysis system 2002 and the information about the second fault reported by the single-domain network fault analysis system 2003. The cross-domain fault analysis system 2001 determines, based on the time correlation and the service information correlation, that the first fault and the second fault are caused by the same fault.

In some embodiments, as shown in FIG. 2, the cross-domain fault analysis system 2001 receives the information about the first fault reported by the single-domain network fault analysis system 2002 and the information about the second fault reported by the single-domain network fault analysis system 2003. The cross-domain fault analysis system 2001 analyzes the time correlation and the service information correlation between the first fault and the second fault. For example, a time correlation result obtained by the cross-domain fault analysis system 2001 is that the first fault and the second fault have no time correlation. In this case, the first fault belongs to a single-domain network fault of the single-domain network 2004, the second fault belongs to a single-domain network fault of the single-domain network 2005, and the cross-domain fault analysis system 2001 stops performing cross-domain fault analysis on the first fault and the second fault.

In some embodiments, as shown in FIG. 2, the cross-domain fault analysis system 2001 receives the information about the first fault reported by the single-domain network fault analysis system 2002 and the information about the second fault reported by the single-domain network fault analysis system 2003. The cross-domain fault analysis system 2001 analyzes the time correlation and the service information correlation between the first fault and the second fault. For example, a time correlation result obtained by the cross-domain fault analysis system 2001 is that the first fault and the second fault have the time correlation. In this case, the cross-domain fault analysis system 2001 obtains the service information correlation between the first fault and the second fault. For example, a time correlation result obtained by the cross-domain fault analysis system 2001 is that the first fault and the second fault have no service information correlation. In this case, the first fault belongs to a single-domain network fault of the single-domain network 2004, the second fault belongs to a single-domain network fault of the single-domain network 2005, and the cross-domain fault analysis system 2001 stops performing cross-domain fault analysis on the first fault and the second fault.

Figure 5A:
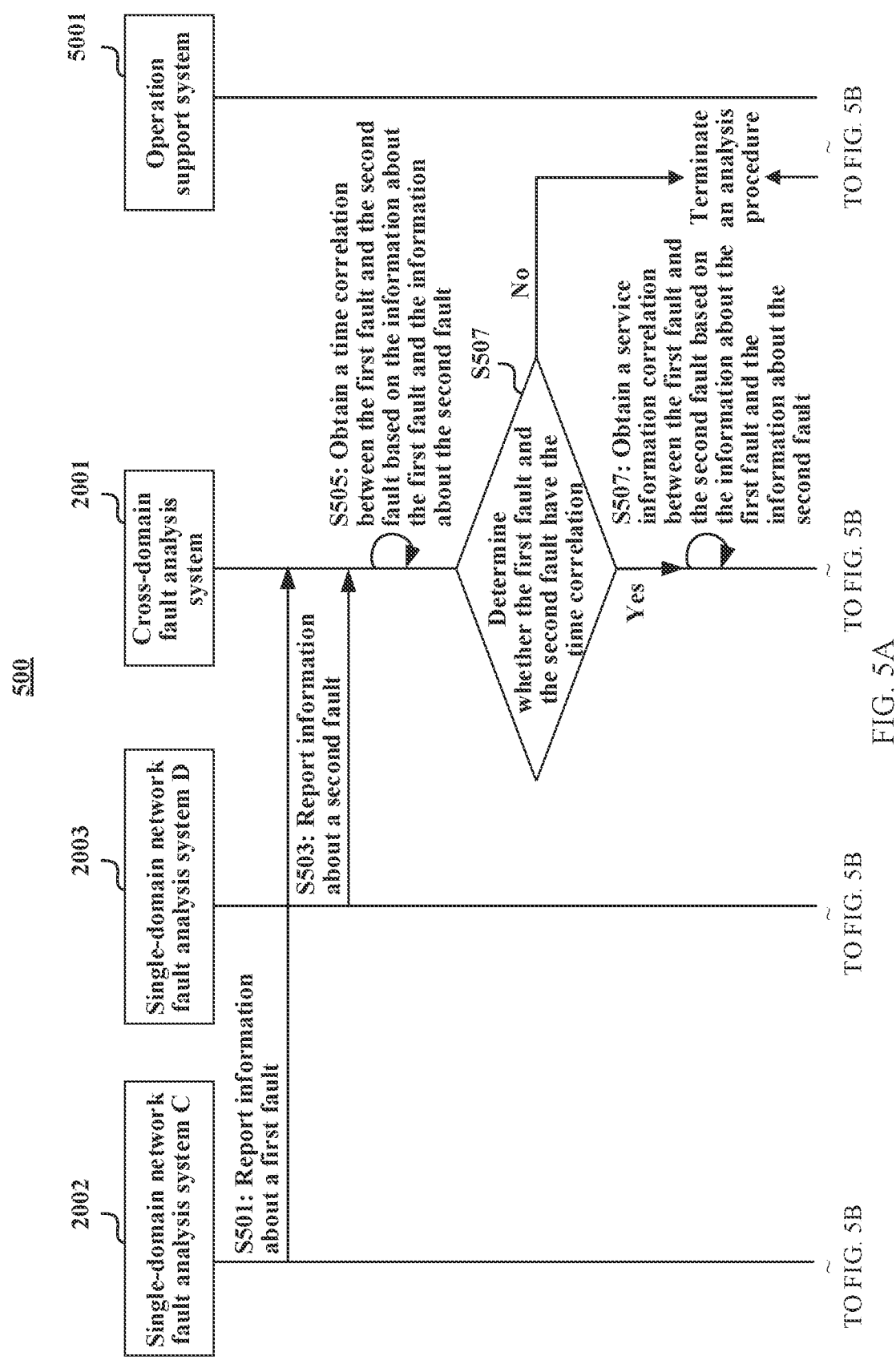
FIG. 5A and FIG. 5B are a flowchart of a cross-domain fault analysis method according to an embodiment of this application.
Figure 5B:
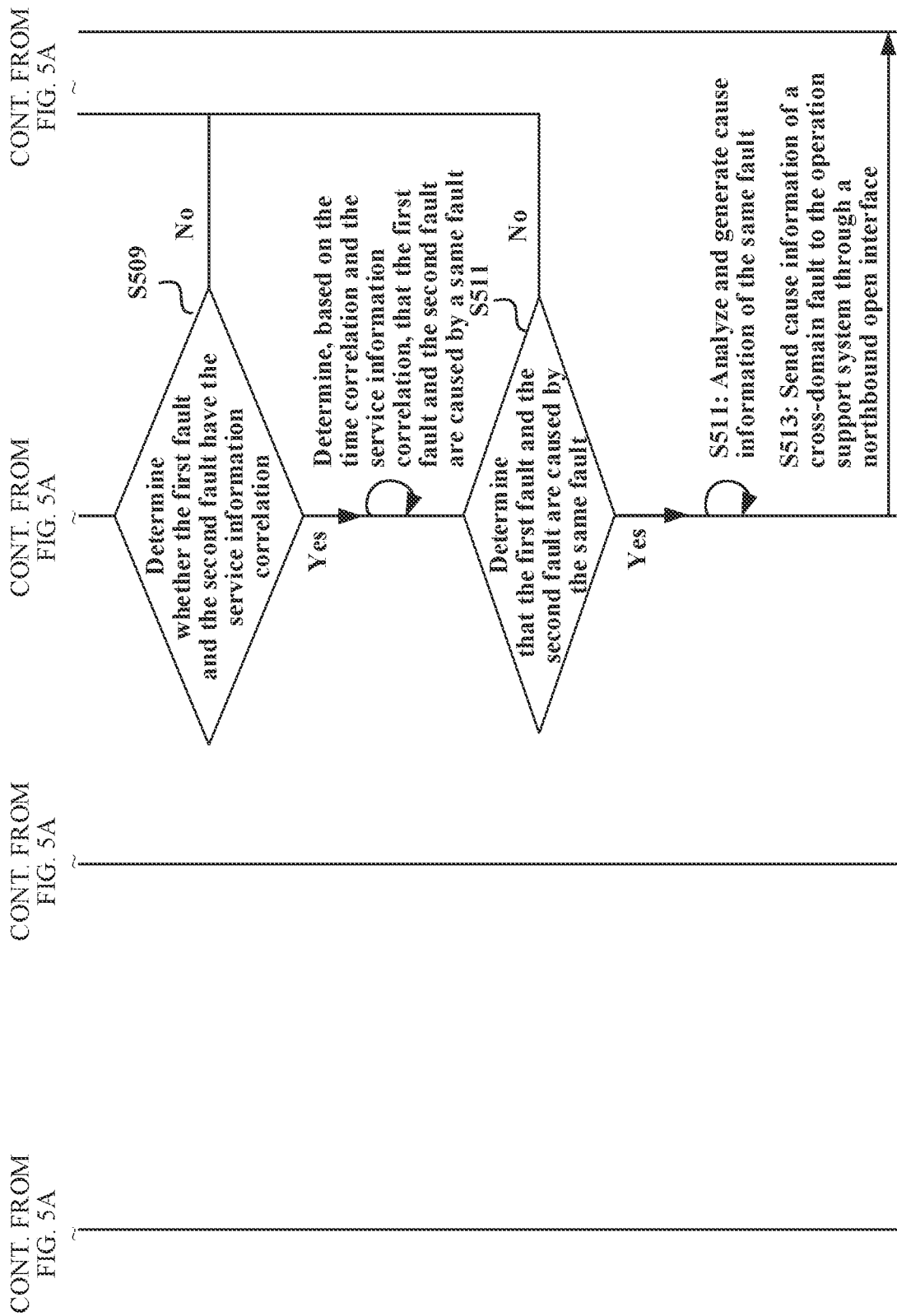

In some embodiments, as shown in FIG. 5A and FIG. 5B, a cross-domain fault analysis system 2001 receives information about a first fault reported by a single-domain network fault analysis system 2002 and information about a second fault reported by a single-domain network fault analysis system 2003. FIG. 5A and FIG. 5B are a schematic diagram of a cross-domain fault analysis scenario. The cross-domain fault analysis system 2001 analyzes a time correlation and a service information correlation between the first fault and the second fault. For example, a time correlation result obtained by the cross-domain fault analysis system 2001 is that the first fault and the second fault have the time correlation. In this case, the cross-domain fault analysis system 2001 obtains the service information correlation between the first fault and the second fault. For example, a time correlation result obtained by the cross-domain fault analysis system 2001 is that the first fault and the second fault have the service information correlation. In this case, the cross-domain fault analysis system 2001 determines, for service information of each single-domain network fault, that is, the first fault and the second fault by using a fault causality or a machine learning method, a same fault that leads to the first fault and the second fault, and a fault cause. For example, a fault causality table is shown in Table 4. Table 4 describes a relationship between a fault cause and a fault manifestation result, a type of a network domain to which the fault may be propagated, and a propagation condition.

TABLE 4

| Fault cause | Fault manifestation result | Type of network domain | Propagation condition |
| --- | --- | --- | --- |
| Network device power failure | Signal loss on network port | IP network and transport network | In network device |
| Network device power failure | Abnormal output optical power | IP network and transport network | In network device |
| Network device power failure | Abnormal receive optical power | IP network and transport network | In network device |
| Port unavailable | Abnormal receive optical power | IP network and transport network | In network device |
| Inability of network device to provide service | Port unavailable | IP network and transport network | In network device |
| Signal loss on network port | IP data packet failed to be sent | IP network | In network device |
| IP data packet failed to be sent | MPLS label distribution path negotiation fails | IP network | Between network devices |
| Inability of network device to provide service | Signal loss on network port | IP network and transport network | Between network devices |
| Mismatched optical channel | Signal loss on network port | IP network and transport network | Between network devices |
| Port unavailable | Signal loss on network port | IP network and transport network | Between network devices |
| Port unavailable | Abnormal receive optical power | IP network and transport network | Between network devices |

For example, based on the fault causality table shown in Table 4 and based on the information about the first fault reported by the single-domain network fault analysis system 2002 and the information about the second fault reported by the single-domain network fault analysis system 2003, the cross-domain fault analysis system 2001 shown in FIG. 5A obtains that the first fault "MPLS label distribution path negotiation between the router 1104 and the router 1101 fails" is caused by "IP data packet of the router 1101 failed to be sent". "IP data packet of the router 1101 failed to be sent" is caused by "signal loss on network port of the router 1101". "Signal loss on a network port of the router 1101" is caused by "inability of network device to provide service" of a peer end network device. Therefore, a root cause of the first fault is "inability of network device to provide service" of the OTN 1201. The second fault "signal loss on optical network port of slot number 1-board 1-port 1 of the OTN 1201" is caused by "port unavailable" of the corresponding device OTN 1201. "Port unavailable" of the OTN 1201 is caused by "inability of network device to provide service". Therefore, a root cause of the second fault is "inability of network device to provide service" of the OTN 1201. The cross-domain fault analysis system 2001 determines that the first fault and the second fault are caused by the same fault. In some embodiments, as shown in FIG. 5A and FIG. 5B, the cross-domain fault analysis system 2001 determines, based on the time correlation and the service information correlation between the first fault and the information about the second fault, that the first fault and the second fault are caused by the same fault. If the first fault and the second fault are caused by the same fault, the cross-domain fault analysis system 2001 provides a cause of the cross-domain fault, and sends cause information of the cross-domain fault to a third-party system, such as an operation support system, through a northbound open interface. Specifically, the method includes the following steps.

S501: Report the information about the first fault.

In some embodiments, a single-domain network fault analysis system, such as the single-domain network fault analysis system 2002 shown in FIG. 2, generates the information about the first fault. The information about the first fault includes first time and first service information of the first fault. The single-domain network fault analysis system 2002 reports the information about the first fault to the cross-domain fault analysis system 2001.

S503: Report the information about the second fault.

In some embodiments, a single-domain network fault analysis system, such as the single-domain network fault analysis system 2003 shown in FIG. 2, generates the information about the second fault. The information about the second fault includes second time and second service information, of the second fault. The single-domain network fault analysis system 2003 reports the information about the second fault to the cross-domain fault analysis system 2001.

S505: Obtain the time correlation between the first fault and the second fault based on the information about the first fault and the information about the second fault.

In some embodiments, the cross-domain fault analysis system 2001 shown in FIG. 2 determines the time correlation based on the first time of the first fault and the second time of the second fault. The time correlation is that a difference between the first time and the second time is less than a time threshold, or the first time and the second time are within a same time window. As shown in FIG. 2, network devices in the single-domain network 2004, network devices in the single-domain network 2005, the single-domain network fault analysis system 2002, the single-domain network fault analysis system 2003, and the cross-domain fault analysis system 2001 each have an independent system clock. Automatic synchronization of the system clock is implemented according to a network time protocol (Network Time Protocol, NTP). For system time of a network device and a system, in some embodiments, the first time is time at which the first fault occurs, and the second time is time at which the second fault occurs. In some embodiments, the first time is a time stamp at which the information about the first fault is generated, and the second time is a time stamp at which the information about the second fault is generated. In some embodiments, the first time is a time stamp at which the information about the first fault is sent, and the second time is a time stamp at which the information about the second fault is sent. In some embodiments, the first time is a time stamp at which the information about the first fault is received, and the second time is a time stamp at which the information about the second fault is received. For example, the first time is $T_1$, and a unit of $T_1$ is second. The second time is $T_2$, and a unit of $T_2$ is second. A time threshold or a time window length of the time correlation is σ with a unit of second. If an absolute value of a difference between $T_1$ and $T_2$ is less than σ, or $T_1$ and $T_2$ may be within a same time window, the first time and the second time have a time correlation. For example, the first time is the time at which the first fault occurs, a value of the first time is 8:55:55 2020-12-12, a value of the second time is 8:59:55 2020-12-12, and a time threshold or time window length is 300 seconds. After calculation, an absolute value of a difference between the first time and the second time is 240 seconds, and the absolute value of the difference is less than the time threshold, or the first time and the second time are within a time window of 300 seconds, so that the first time and the second time have a time correlation. Therefore, the first fault and the second fault have no time correlation. For example, the first time is time at which the information about the first fault is generated. In some embodiments, the information about the first fault is generated by a single-domain network fault analysis system, a value of the first time is 8:56:10 2020-12-12, a value of the second time is 9:00:30 2020-12-12, and a time threshold or time window length is 200 seconds. After calculation, an absolute value of a difference between the first time and the second time is 260 seconds, and the absolute value of the difference is greater than the time threshold, or the first time and the second time are not within a time window of 300 seconds, so that the first time and the second time have no time correlation. Therefore, the first fault and the second fault have no time correlation.

S507: Determine whether the first fault and the second fault have the time correlation. If the first fault and the second fault have the time correlation, the service information correlation between the first fault and the second fault is obtained based on the information about the first fault and the information about the second fault. If the first fault and the second fault have no time correlation, an analysis procedure is terminated.

In some embodiments, the cross-domain fault analysis system 2001 may obtain the time correlation between the first fault and the second fault based on the operation in S507. The cross-domain fault analysis system determines whether the first fault and the second fault have the time correlation. If the first fault and the second fault have the time correlation, the service information correlation between the first fault and the second fault is obtained based on the information about the first fault and the information about the second fault. If the first fault and the second fault have no time correlation, an analysis procedure is terminated. In some embodiments, the cross-domain fault analysis system 2001 determines the service information correlation based on service information of the first fault and service information of the second fault. Service information of a fault generated by the single-domain network fault analysis system includes service type information corresponding to the fault, network topology information of a single-domain network in which the fault occurs, information about a network device in which the fault occurs, and information about a service procedure in which the fault occurs.

In some embodiments, the first service information is service type information corresponding to the first fault, and the second service information is service type information corresponding to the second fault. The service information correlation between the first service information and the second service information is determined based on the first service information and the second service information. In this case, the service information correlation is a constraint condition for determining the service type information corresponding to the first fault and the service type information corresponding to the second fault. In some embodiments, if the service type information corresponding to the first fault is the same as the service type information corresponding to the second fault, the cross-domain fault analysis system determines that the service information correlation meets the constraint condition, and the first service information and the second service information have the service information correlation. In some embodiments, if the service type information corresponding to the first fault and the service type information corresponding to the second fault meet the service correlation relationship, the cross-domain fault analysis system determines that the service information correlation meets the constraint condition, and the first service information and the second service information have the service information correlation. For example, as shown in Table 2, service type information of the fault 1001 of the single-domain network 2004 is the service type information 1: IP network and the service type information 2: MPLS. As shown in Table 3, a service type of the fault 2001 of the single-domain network 2005 is the OTN network. As shown in FIG. 2, the single-domain network 2004 is the IP network 110 shown in FIG. 1, and the single-domain network 2005 is the transport network 120 shown in FIG. 1. The single-domain network 2004 and the single-domain network 2005 are further connected by an optical fiber, data transmission needs to be performed based on the OTN network of the single-domain network 2005, and a dependency relationship exists on a physical link. Therefore, the cross-domain fault analysis system 2001 is associated with an IP network service and an OTN network service. It is determined that the service type information of the fault 1001 and the service type information of the fault 2001 meet the constraint condition, and the fault 1001 and the fault 2001 have the service information correlation.

Figure 4:
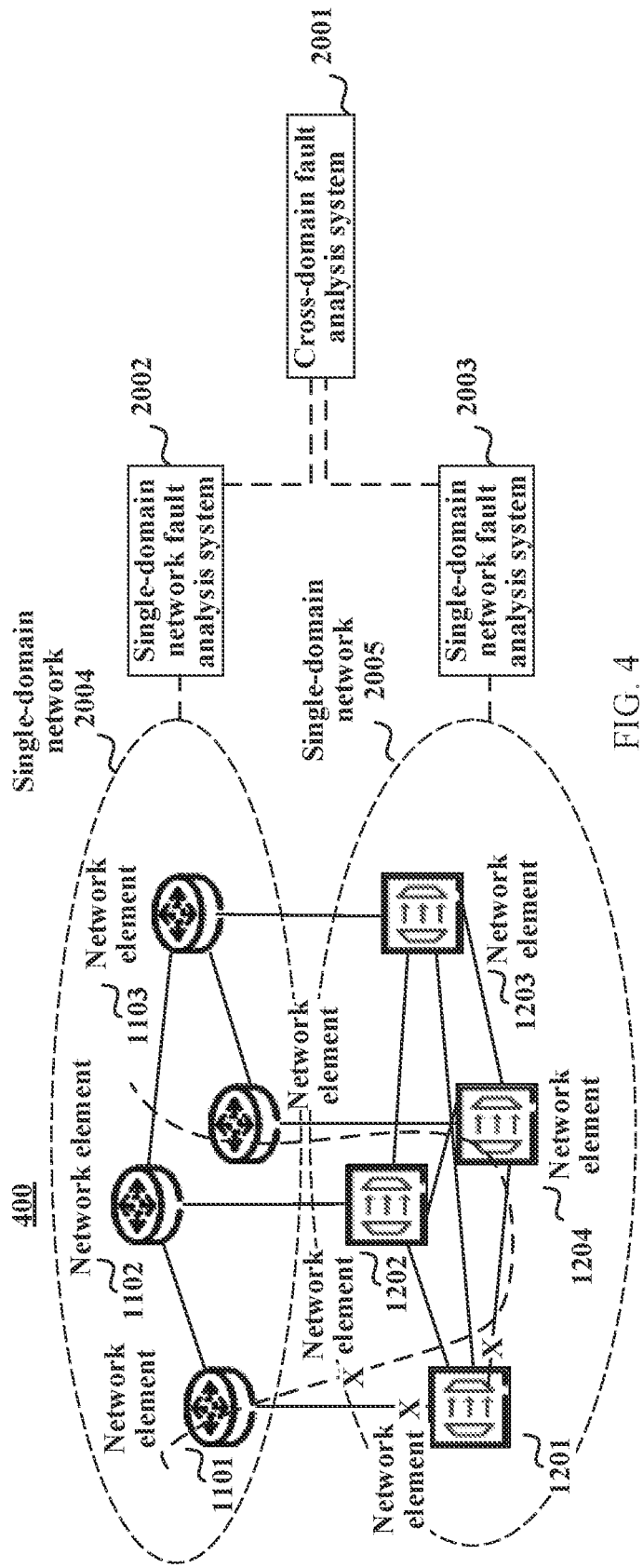
FIG. 4 is a schematic diagram of a cross-domain fault according to an embodiment of this application.

In some embodiments, the first service information is network topology information of a single-domain network in which the first fault occurs, and the second service information is network topology information of a single-domain network in which the second fault occurs. The service information correlation between the first service information and the second service information is determined based on the first service information and the second service information. In some embodiments, the service information correlation is used to determine a correlation relationship between network topology information of a first service and network topology information of a second service. For example, as shown in FIG. 4, a multi-domain network 400 includes a single-domain network 2004 and a single-domain network 2005. The single-domain network 2004 is the IP network 110 shown in FIG. 1, the single-domain network 2005 is the transport network 120 shown in FIG. 1. Information about the fault 1001 generated by the single-domain network fault analysis system 2002 corresponding to the single-domain network 2004 is shown in Table 2. Information about the fault 2001 generated by the single-domain network fault analysis system 2003 corresponding to the single-domain network 2005 is shown in Table 3. Cross-domain topology data of the single-domain network 2004 and the single-domain network 2005 is input to the cross-domain fault analysis system 2001. The cross-domain topology data includes a cross-domain link name, a link type, and port information corresponding to a link. For example, the cross-domain topology data between the single-domain network 2004 and the single-domain network 2005 includes cross-domain link names of the network elements 1101 to 1104 of the single-domain network 2004 and network elements 1201 to 1204 of the single-domain network 2005, the cross-domain link type, and port information corresponding to the cross-domain link. The cross-domain fault analysis system 2001 receives the information about the fault 1001 generated by the single-domain network fault analysis system 2002. The cross-domain fault analysis system 2001 obtains the network topology information of the single-domain network 2004 in which the fault 1001 occurs. The cross-domain fault analysis system 2001 receives the information about the fault 2001 generated by the single-domain network fault analysis system 2003. The cross-domain fault analysis system 2001 obtains the network topology information of the single-domain network 2005 in which the fault 2001 occurs. The cross-domain fault analysis system 2001 determines, based on the cross-domain topology data, the network topology information of the fault 1001 shown in Table 2, and the network topology information of the fault 2001 shown in Table 3, that the network topology information of the fault 1001 and the network topology information of the fault 2001 have a common network device node. Therefore, there is a correlation relationship between the network topology information of the fault 1001 and the network topology information of the fault 2001, and service information of the fault 1001 and service information of the fault 2001 have a service information correlation.

In some embodiments, the first service information is information about a service procedure in which the first fault occurs, and the second service information is information about a service procedure in which the second fault occurs. The service information correlation between the first service information and the second service information is determined based on the first service information and the second service information. In this case, the service information correlation is used to determine that the information about the service procedure in which the first fault occurs and the information about the service procedure in which the second fault occurs belong to a same service procedure or belong to a service procedure causality. For example, the single-domain network 2004 in FIG. 4 is the IP network 110 shown in FIG. 1, and the single-domain network 2005 is the transport network 120 shown in FIG. 1. The information that is about the service procedure in which the fault occurs and that is in the information about the fault 1001 generated by the single-domain network fault analysis system 2002 of the single-domain network 2004 is that "MPLS label distribution path negotiation between the router 1104 and the router 1101 fails". The information that is about the service procedure in which the fault occurs and that is in the information about the fault 2001 generated by the single-domain network fault analysis system 2003 of the single-domain network 2005 is "signal loss on optical network port of slot number 1-board 1-port 1 of the OTN 1201". On the basis of the cross-domain network topologies of the single-domain network 2004 and the single-domain network 2005, the cross-domain fault analysis system 2001 may analyze that data packet communication between the router 1101 and the router 1104 is based on an optical fiber link between the OTN 1201 and the OTN 1204. Therefore, the information about the service procedure in which the fault 2001 occurs is "signal loss on optical network port of slot number 1-board 1-port 1 of the OTN 1201", causing the fiber link between the OTN 1201 and the OTN 1204 to be unavailable. In this case, data packet communication between the router 1101 and the router 1104 fails. As a result, the service procedure information of the fault 1001 is that "MPLS label distribution path negotiation between the router 1104 and the router 1101 fails". Therefore, the service information of the fault 1001 and the service information of the fault 2001 have a correlation relationship, and the service information of the fault 1001 and the service information of the fault 2001 have a service information correlation.

In some embodiments, if the first fault and the second fault have no time correlation, and the first fault and the second fault belong to single-domain network faults, the cross-domain fault analysis system 2001 notifies the single-domain network fault analysis system 2002 and the single-domain network fault analysis system 2003 through northbound open interfaces of the corresponding single-domain network fault analysis system 2002 and single-domain network fault analysis system 2003, to analyze and process the first fault and the second fault as the single-domain network faults, and the cross-domain fault analysis system 2001 terminates the analysis procedure.

S509: Determine whether the first fault and the second fault have the service information correlation. If the first fault and the second fault have the service information correlation, determine, based on the time correlation and the service information correlation between the first fault and the second fault, that the first fault and the second fault are caused by the same fault. If the first fault and the second fault have no service information correlation, terminate the analysis procedure.

In some embodiments, the cross-domain fault analysis system 2001 determines, based on the operation in S507, whether the first fault and the second fault have the service information correlation. If the first fault and the second fault have the service information correlation, it is determined, based on the time correlation and the service information correlation between the first fault and the second fault, that the first fault and the second fault are caused by the same fault. If the first fault and the second fault have no service information correlation, the analysis procedure is terminated. In this case, the cross-domain fault analysis system 2001 determines, for service information of each single-domain network fault, that is, the service information of the first fault and the second fault by using a fault causality or a machine learning method, a same fault that leads to the first fault and the second fault, and a fault cause. For example, a fault causality table is shown in Table 5. Table 5 describes a relationship between a fault cause and a fault manifestation result, a type of a network domain to which the fault may be propagated, and a propagation condition.

TABLE 5

| Fault cause | Fault manifestation result | Type of network domain | Propagation condition |
| --- | --- | --- | --- |
| Network device power failure | Signal loss on network port | IP network and transport network | In network device |
| Network device power failure | Abnormal output optical power | IP network and transport network | In network device |
| Network device power failure | Abnormal receive optical power | IP network and transport network | In network device |
| Port unavailable | Abnormal receive optical power | IP network and transport network | In network device |
| Inability of network device to provide service | Port unavailable | IP network and transport network | In network device |
| Signal loss on network port | IP data packet failed to be sent | IP network | In network device |
| IP data packet failed to be sent | MPLS label distribution path negotiation fails | IP network | Between network devices |
| Inability of network device to provide service | Signal loss on network port | IP network and transport network | Between network devices |
| Mismatched optical channel | Signal loss on network port | IP network and transport network | Between network devices |
| Port unavailable | Signal loss on network port | IP network and transport network | Between network devices |
| Port unavailable | Abnormal receive optical power | IP network and transport network | Between network devices |

For example, based on the fault causality table shown in Table 5 and based on the information about the first fault reported by the single-domain network fault analysis system 2002 and the information about the second fault reported by the single-domain network fault analysis system 2003, as shown in FIG. 2 and Table 3, the cross-domain fault analysis system 2001 obtains that the first fault "MPLS label distribution path negotiation between the router 1104 and the router 1101 fails" is caused by "IP data packet of the router 1101 failed to be sent". "IP data packet of the router 1101 failed to be sent" is caused by "signal loss on network port of the router 1101". "Signal loss on network port of the router 1101" is caused by "inability of network device to provide service" of a peer end network device. Therefore, a root cause of the first fault is "inability of network device to provide service" of the OTN 1201. The second fault "signal loss on optical network port of slot number 1-board 1-port 1 of the OTN 1201" is caused by "port unavailable" of the corresponding device OTN 1201. "Port unavailable" of the OTN 1201 is caused by "inability of network device to provide service". Therefore, a root cause of the second fault is "inability of network device to provide service" of the OTN 1201. The cross-domain fault analysis system 2001 determines that the first fault and the second fault are caused by the same fault.

In some embodiments, if the first fault and the second fault have no service information correlation, and the first fault and the second fault belong to single-domain network faults, the cross-domain fault analysis system 2001 notifies the single-domain network fault analysis system 2002 and the single-domain network fault analysis system 2003 through northbound open interfaces of the corresponding single-domain network fault analysis system 2002 and single-domain network fault analysis system 2003, to analyze and process the first fault and the second fault as the single-domain network faults, and the cross-domain fault analysis system 2001 terminates the analysis procedure.

S511: Determine that the first fault and the second fault are caused by the same fault. If the first fault and the second fault are caused by the same fault, analyze and generate cause information of the same fault. If the first fault and the second fault are not caused by the same fault, terminate the analysis procedure.

In some embodiments, the cross-domain fault analysis system 2001 determines that the first fault and the second fault are caused by the same fault. If the first fault and the second fault are caused by the same fault, the cause information of the same fault is analyzed and generated. If the first fault and the second fault are not caused by the same fault, the analysis procedure is terminated. In some embodiments, if the first fault and the second fault are not caused by the same fault, and the first fault and the second fault belong to single-domain network faults, the cross-domain fault analysis system 2001 notifies the single-domain network fault analysis system 2002 and the single-domain network fault analysis system 2003 through northbound open interfaces of the corresponding single-domain network fault analysis system 2002 and single-domain network fault analysis system 2003, to analyze and process the first fault and the second fault as the single-domain network faults, and the cross-domain fault analysis system 2001 terminates the analysis procedure.

S513: Send cause information of a cross-domain fault to an operation support system through the northbound open interface.

Figure 6:
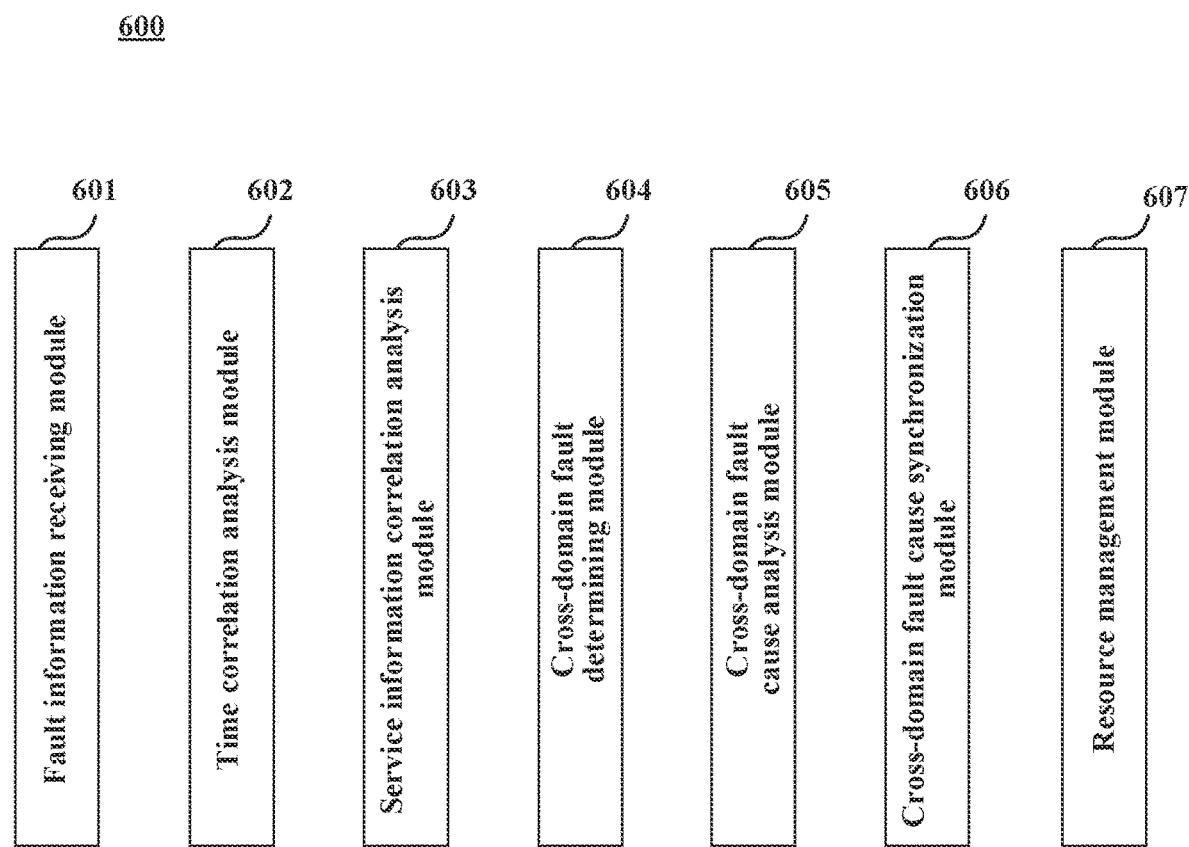
FIG. 6 is a schematic diagram of a cross-domain fault analysis system 600 according to an embodiment of this application.

In some embodiments, the cross-domain fault analysis system 2001 generates, based on the operation in S511, the cause information that leads to the cross-domain fault of the first fault and the second fault. The cross-domain fault analysis system 2001 sends the cause information to a third-party system, for example, the operation support system 5001 shown in FIG. 5A, through the northbound open interface. An embodiment of this application further provides a cross-domain fault analysis system. FIG. 6 is a schematic diagram of a structure of a cross-domain fault analysis system 600 according to an embodiment of this application. The cross-domain fault analysis system 600 is configured to perform the foregoing plurality of embodiments by using various modules shown in FIG. 6, for example, operations performed by the cross-domain fault analysis systems in embodiments corresponding to FIG. 3 and FIG. 4. As shown in FIG. 6, the cross-domain fault analysis system 600 includes the following modules:

a fault information receiving module 601, configured to obtain information about a first fault in a first network domain, for example, the single-domain network 2004 shown in FIG. 2, and information about a second fault in a second network domain, for example, the single-domain network 2005 shown in FIG. 2. The information about the first fault includes first time of the first fault and first service information of the first fault. The information about the second fault includes second time of the second fault and second service information of the second fault;

a time correlation analysis module 602, configured to determine a time correlation based on the first time and the second time, where the time correlation is that the first time and the second time meet a time constraint condition;

a service information correlation analysis module 603, configured to determine a service information correlation based on the first service information and the second service information, where the service information correlation is that the first service information and the second service information meet a service information constraint condition;

a cross-domain fault determining module 604, configured to determine, based on the time correlation and the service information correlation, that the first fault in the first network domain and the second fault in the second network domain are caused by a same fault;

a cross-domain fault cause analysis module 605, configured to determine cause information of the fault based on the information about the first fault and the information about the second fault; and a cross-domain fault cause synchronization module 606, configured to send the cause information of the fault to a third-party system through a northbound interface.

In some embodiments, the cross-domain fault analysis system 600 may further include the following module:

a resource management module 607, configured to manage resource information of single-domain networks forming a multi-domain network and resource information of the third-party system, for example, a name of the single-domain network, a network service type, network topology information, cross-domain topology information of the multi-domain network, and an internet protocol (Internet Protocol, IP) address of the third-party system.

In some embodiments, the modules in the cross-domain fault analysis system 600 may be deployed in a same physical device. In some other embodiments, the modules in the cross-domain fault analysis system 600 may be deployed in a plurality of different physical devices. Each module in the cross-domain fault analysis system 600 may be a hardware module or a module that combines software and hardware.

Figure 7:
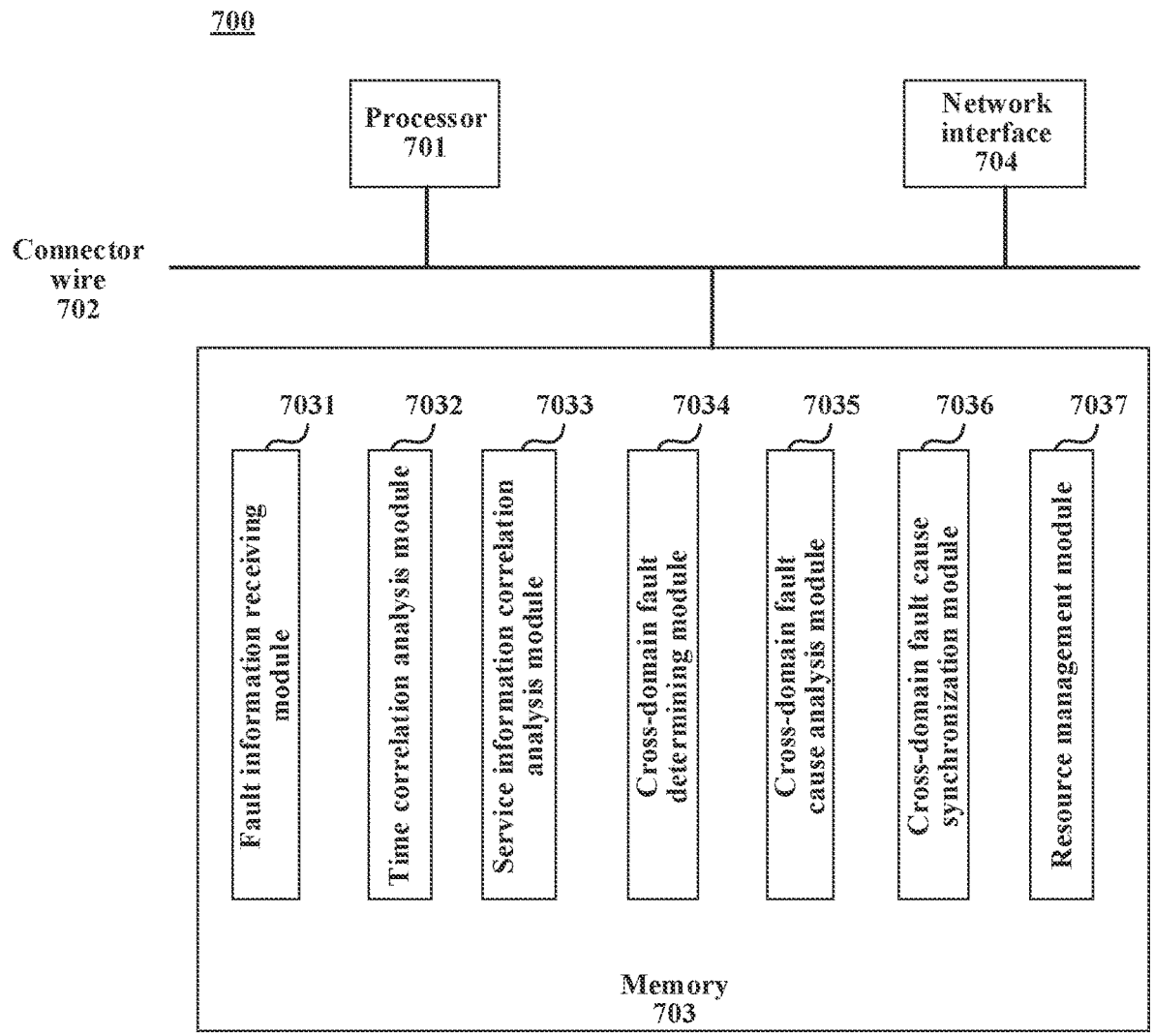
FIG. 7 is a schematic diagram of a cross-domain fault analysis system 700 according to an embodiment of this application.

FIG. 7 is a schematic diagram of a structure of a cross-domain fault analysis system 700 according to an embodiment of this application. The cross-domain fault analysis system 700 shown in FIG. 7 is configured to perform the foregoing plurality of embodiments, for example, operations performed by the cross-domain fault analysis systems in embodiments corresponding to FIG. 3 and FIG. 4. As shown in FIG. 7, the system 700 includes at least one processor 701, a connector wire 702, a memory 703, and at least one network interface 704.

The processor 701 is, for example, a general-purpose central processing unit (Central Processing Unit, CPU), a digital signal processor (Digital Signal Processor, DSP), a network processor (Network Processor, NP), a graphics processing unit (Graphics Processing Unit, GPU), a neural-network processing unit (Neural-network Processing Unit, NPU), a data processing unit (Data Processing Unit, DPU), a microprocessor, or one or more integrated circuits configured to implement the solutions of this application. For example, the processor 701 includes an application-specific integrated circuit (Application-specific Integrated Circuit, ASIC), a programmable logic device (Programmable Logic Device, PLD) or another programmable logic device, a transistor logic device, a hardware component, or any combination thereof. The PLD may be, for example, a complex programmable logic device (Complex Programmable Logic Device, CPLD), a field-programmable logic gate array (Field-programmable Gate Array, FPGA), a generic array logic (Generic Array Logic, GAL), or any combination thereof. The processor 701 may implement or execute various logical blocks, modules, and circuits described with reference to content disclosed in embodiments of this application. Alternatively, the processor may be a combination of processors implementing a calculation function, for example, including a combination of one or more microprocessors, or a combination of a DSP and a microprocessor.

The cross-domain fault analysis system 700 may further include a connector wire 702. The connector wire 702 is configured to transmit information between components of the cross-domain fault analysis system 700. The bus may be a peripheral component interconnect (Peripheral Component Interconnect, PCI) bus, an extended industry standard architecture (Extended Industry Standard Architecture, EISA) bus, and or the like. Buses may be classified into an address bus, a data bus, a control bus, and the like. For ease of representation, only one bold line is used for representation in FIG. 7, but this does not mean that there is only one bus or only one type of bus.

The memory 703 is, for example, a read-only memory (Read-only Memory, ROM) or another type of static storage device that can store static information and instructions, or a random access memory (Random access Memory, RAM) or another type of dynamic storage device that can store information and instructions, or an electrically erasable programmable read-only memory (Electrically Erasable programmable read-only Memory, EEPROM), a compact disc read-only memory (Compact Disc Read-only Memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that can be accessed by a computer. However, the memory 703 is not limited thereto. The memory 703, for example, exists independently, and is connected to the processor 701 via the bus. Alternatively, the memory 703 may be integrated with the processor 701.

The network interface 704 uses any transceiver-type apparatus, and is configured to communicate with another device or a communication network. The communication network may be the Ethernet, a radio access network, a wireless local area network (Wireless Local Area Network, WLAN), or the like. The network interface 704 may include a wired communication interface, and may further include a wireless communication interface. Specifically, the network interface 704 may be an Ethernet interface, a fast Ethernet (Fast Ethernet, FE) interface, a gigabit Ethernet (Gigabit Ethernet, GE) interface, an asynchronous transfer mode (Asynchronous Transfer Mode, ATM) interface, a wireless local area network WLAN interface, a cellular network communication interface or a combination thereof. The Ethernet interface may be an optical interface, an electrical interface, or a combination thereof. In this embodiment of this application, the network interface 704 may be used by the system 700 to communicate with another device.

In specific implementation, in an embodiment, the processor 701 may include one or more CPUs. Each of the processors may be a single-core processor, or may be a multi-core processor. The processor herein may be one or more devices, circuits, and/or processing cores configured to process data (for example, computer program instructions).

In specific implementation, in an embodiment, the cross-domain fault analysis system 700 may include a plurality of processors. Each of the processors may be a single-core processor, or may be a multi-core processor. The processor herein may be one or more devices, circuits, and/or processing cores configured to process data (for example, computer program instructions).

In specific implementation, in an embodiment, the cross-domain fault analysis system 700 may further include an output device and an input device. The output device communicates with the processor 701, and may display information in a plurality of manners. For example, the output device may be a liquid crystal display (Liquid Crystal Display, LCD), a light emitting diode (Light Emitting Diode, LED) display device, a cathode ray tube (Cathode Ray Tube, CRT) display device, a projector, or the like. The input device communicates with the processor 701, and may receive an input from a user in a plurality of manners. For example, the input device may be a mouse, a keyboard, a touchscreen device, a sensor device, or the like.

In some embodiments, the memory 703 is configured to store a program module and data. The program module includes a fault information receiving module 7031, a time correlation analysis module 7032, a service information correlation analysis module 7033, a cross-domain fault determining module 7034, a cross-domain fault cause analysis module 7035, a cross-domain fault cause synchronization module 7036, and a resource management module 7037. In some embodiments, each module in the memory 703 in FIG. 7 corresponds to each module shown in FIG. 6. The processor 701 can perform, by executing computer-readable instructions in each module in the memory 703, operations that can be performed by each module shown in FIG. 6.

In a specific embodiment, the cross-domain fault analysis system 700 in this embodiment of this application may correspond to the cross-domain fault analysis system 2001 in the foregoing plurality of embodiments, for example, in the plurality of embodiments corresponding to FIG. 3 and FIG. 4. The processor 701 in the cross-domain fault analysis system 700 reads instructions in the memory 703, so that the cross-domain fault analysis system 700 shown in FIG. 7 can perform all or some operations of the cross-domain fault analysis system in the foregoing plurality of embodiments.

An operating sequence in the specification, claims, and the foregoing accompanying drawings of this application is not limited to a specific order or sequence in a description. It should be understood that the data used in such a way are simultaneous or may change the order in appropriate cases, so that described embodiments can be implemented in other orders than the order illustrated or described in the accompanying drawings.

A person of ordinary skill in the art may understand that all or some of the steps of the foregoing method embodiments may be implemented by a program instructing related hardware. The foregoing program may be stored in a computer-readable storage medium. When the program is run, the steps including the foregoing method embodiments are performed. The foregoing storage medium includes any medium that can store program code, such as a ROM, a RAM, a magnetic disk, or an optical disc.

Some embodiments of this application provide a computer program product. When the computer program product is executed by a computer, the computer is enabled to perform operations performed by the cross-domain fault analysis system in a plurality of embodiments of this application.

Some embodiments of this application provide a computer-readable storage medium, for example, a hard disk, a memory, or a flash memory. The computer storage medium stores computer-readable instructions. When executing the computer-readable instructions, the computer can perform operations performed by the cross-domain fault analysis system in a plurality of embodiments of this application.

Some embodiments of this application provide a cross-domain fault analysis system including a plurality of modules. The plurality of modules cooperate to perform operations performed by the cross-domain fault analysis system in a plurality of embodiments of this application. The plurality of modules may be in a same hardware device, or may be in different hardware devices.

The foregoing descriptions are merely example specific implementations of this application, but are not intended to limit the protection scope of this application. Any variation or replacement readily figured out by a person skilled in the art within the technical scope disclosed in this application shall fall within the protection scope of this application.

What is claimed is:

1. A method, comprising:
    obtaining information about a first fault in a first network domain and information about a second fault in a second network domain, wherein the information about the first fault comprises a first time of the first fault and first service information of the first fault, and the information about the second fault comprises a second time of the second fault and second service information of the second fault;
    determining a time correlation based on the first time and the second time, wherein the time correlation is that the first time and the second time meet a time constraint condition;
    determining a service information correlation based on the first service information and the second service information, wherein the service information correlation is that the first service information and the second service information meet a service information constraint condition; and
    determining, based on the time correlation and the service information correlation, that the first fault in the first network domain and the second fault in the second network domain are caused by a same fault.

2. The method according to claim 1, wherein the method further comprises:
    determining cause information of the same fault based on the information about the first fault and the information about the second fault; and
    sending the cause information of the same fault to a third-party system through a northbound interface.

3. The method according to claim 1, wherein the time constraint condition is that an absolute value of a difference between the first time and the second time is less than a time threshold or that the first time and the second time are within a same time window.

4. The method according to claim 1, wherein:
    the first time comprises at least one of a time at which the first fault occurs, a time at which the information about the first fault is generated, a time at which the information about the first fault is sent, or a time at which the information about the first fault is received; and
    the second time comprises at least one of a time at which the second fault occurs, a time at which the information about the second fault is generated, a time at which the information about the second fault is sent, or a time at which the information about the second fault is received.

5. The method according to claim 1, wherein:
    the first service information comprises at least one of service type information of the first fault, network topology information of the first network domain in which the first fault occurs, information about a network device in which the first fault occurs, or information about a service procedure in which the first fault occurs; and
    the second service information comprises at least one of service type information of the second fault, the network topology information of the first network domain in which the second fault occurs, information about a network device in which the second fault occurs, or information about a service procedure in which the second fault occurs.

6. The method according to claim 1, wherein the service information constraint condition is:
    that service type information of the first service information and service type information of the second service information belong to a same service type or correlated service types;
    that network topology information of the first service information and network topology information of the second service information are network topology information of a same network topology; or
    that service procedure information of the first service information and service procedure information of the second service information belong to a same service procedure or belong to a fault causality.

7. The method according to claim 1, wherein obtaining the information about the first fault in the first network domain and the information about the second fault in the second network domain comprises:
    receiving the information about the first fault from a fault analysis system of the first network domain; and
    receiving the information about the second fault from a fault analysis system of the second network domain.

8. The method according to claim 1, wherein obtaining the information about the first fault in the first network domain and the information about the second fault in the second network domain comprises:
receiving, from a fault analysis system of the first network domain, first basic information for generating the information about the first fault;
receiving, from a fault analysis system of the second network domain, second basic information for generating the information about the second fault;
generating the information about the first fault based on the first basic information; and
generating the information about the second fault based on the second basic information.

9. The method according to claim 1, wherein the method is executed by a cross-domain fault analysis system.

10. An apparatus, wherein the apparatus comprises:
at least one processor; and
at least one non-transitory computer-readable storage medium storing programming instructions for execution by the at least one processor to:
obtain information about a first fault in a first network domain and information about a second fault in a second network domain, wherein the information about the first fault comprises a first time of the first fault and first service information of the first fault, and the information about the second fault comprises a second time of the second fault and second service information of the second fault;
determine a time correlation based on the first time and the second time, wherein the time correlation is that the first time and the second time meet a time constraint condition;
determine a service information correlation based on the first service information and the second service information, wherein the service information correlation is that the first service information and the second service information meet a service information constraint condition; and
determine, based on the time correlation and the service information correlation, that the first fault in the first network domain and the second fault in the second network domain are caused by a same fault.

11. The apparatus according to claim 10, wherein the programming instructions are for execution by the at least one processor to:
determine cause information of the same fault based on the information about the first fault and the information about the second fault; and
send the cause information of the same fault to a third-party system through a northbound interface.

12. The apparatus according to claim 10, wherein the time constraint condition is that an absolute value of a difference between the first time and the second time is less than a time threshold or an absolute value of a difference between the first time and the second time is less than a time threshold or that the first time and the second time are within a same time window.

13. The apparatus according to claim 10, wherein:
the first time comprises at least one of a time at which the first fault occurs, a time at which the information about the first fault is generated, a time at which the information about the first fault is sent, or a time at which the information about the first fault is received; and
the second time comprises at least one of a time at which the second fault occurs, a time at which the information about the second fault is generated, a time at which the information about the second fault is sent, or a time at which the information about the second fault is received.

14. The apparatus according to claim 10, wherein:
the first service information comprises at least one of service type information of the first fault, network topology information of the first network domain in which the first fault occurs, information about a network device in which the first fault occurs, or information about a service procedure in which the first fault occurs; and
the second service information comprises at least one of service type information of the second fault, the network topology information of the first network domain in which the second fault occurs, information about a network device in which the second fault occurs, or information about a service procedure in which the second fault occurs.

15. The apparatus according to claim 10, wherein the service information constraint condition is:
that service type information of the first service information and service type information of the second service information belong to a same service type or correlated service types;
that network topology information of the first service information and network topology information of the second service information are network topology information of a same network topology; or
that service procedure information of the first service information and service procedure information of the second service information belong to a same service procedure or belong to a fault causality.

16. The apparatus according to claim 10, wherein the programming instructions are for execution by the at least one processor to:
receive the information about the first fault from a fault analysis system of the first network domain; and
receive the information about the second fault from a fault analysis system of the second network domain.

17. The apparatus according to claim 10, wherein the programming instructions are for execution by the at least one processor to:
receive, from a fault analysis system of the first network domain, first basic information for generating the information about the first fault;
receive, from a fault analysis system of the second network domain, second basic information for generating the information about the second fault;
generate the information about the first fault based on the first basic information; and
generate the information about the second fault based on the second basic information.

18. A non-transitory storage medium storing a program which, when executed by one or more processors, cause the one or more processors to perform operations, the operations comprising:
obtaining information about a first fault in a first network domain and information about a second fault in a second network domain, wherein the information about the first fault comprises a first time of the first fault and first service information of the first fault, and the information about the second fault comprises a second time of the second fault and second service information of the second fault;

determining a time correlation based on the first time and the second time, wherein the time correlation is that the first time and the second time meet a time constraint condition;

determining a service information correlation based on the first service information and the second service information, wherein the service information correlation is that the first service information and the second service information meet a service information constraint condition; and determining, based on the time correlation and the service information correlation, that the first fault in the first network domain and the second fault in the second network domain are caused by a same fault.

19. The non-transitory storage medium according to claim 18, wherein the operations further comprise:

determining cause information of the same fault based on the information about the first fault and the information about the second fault; and sending the cause information of the same fault to a third-party system through a northbound interface.

20. The non-transitory storage medium according to claim 18, wherein the time constraint condition is that an absolute value of a difference between the first time and the second time is less than a time threshold or that the first time and the second time are within a same time window.

* * * * *